United States Patent [19]

Dementhon

[11] 4,412,417
[45] Nov. 1, 1983

[54] WAVE ENERGY CONVERTER

[75] Inventor: Daniel Dementhon, Annapolis, Md.

[73] Assignee: Tracor Hydronautics, Incorporated, Laurel, Md.

[21] Appl. No.: 263,886

[22] Filed: May 15, 1981

[51] Int. Cl.³ ............................................. F03B 13/12
[52] U.S. Cl. ........................................ 60/497; 60/398; 415/7
[58] Field of Search .................................. 60/497–507, 60/398; 415/7; 290/53, 54

[56] References Cited

U.S. PATENT DOCUMENTS 3,818,704  6/1974  Lapeyre ............................ 60/398 X
4,224,793  9/1980  Gutsfeld ............................... 60/398

Primary Examiner—Allen M. Ostrager
Attorney, Agent, or Firm—Finnegan, Henderson, Farabow, Garrett & Dunner

[57] ABSTRACT

An improved rotational buoyant mass for wave energy conversion apparatus is disclosed. The rotational buoyant mass comprises at least one pair of helical volumes mounted for rotation about a common axis. The helical volumes are rotationally displaced with respect to one another about the common axis. The improved rotational buoyant mass may include multiple pairs of helices, the helices of respective pairs being displaced with respect to one another.

30 Claims, 29 Drawing Figures

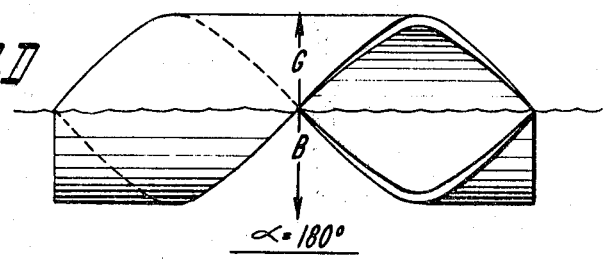
Fig. 2D  α=180°
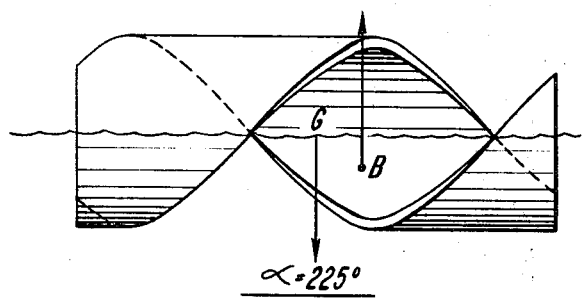
Fig. 2E  α=225°
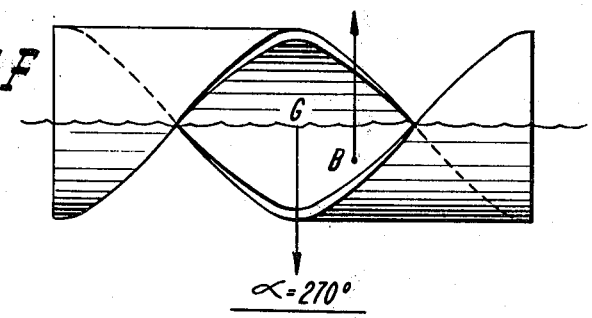
Fig. 2F  α=270°
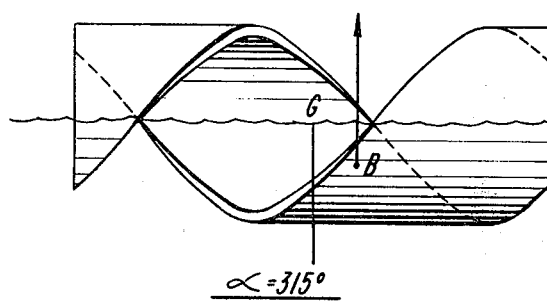
Fig. 2G  α=315°
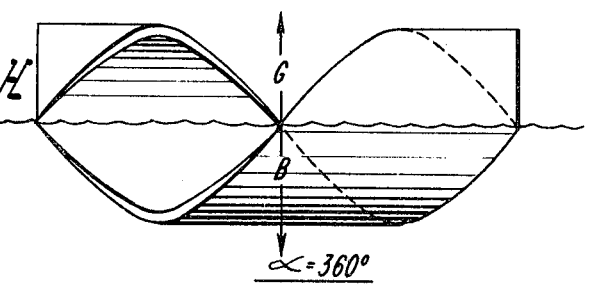
Fig. 2H  α=360°

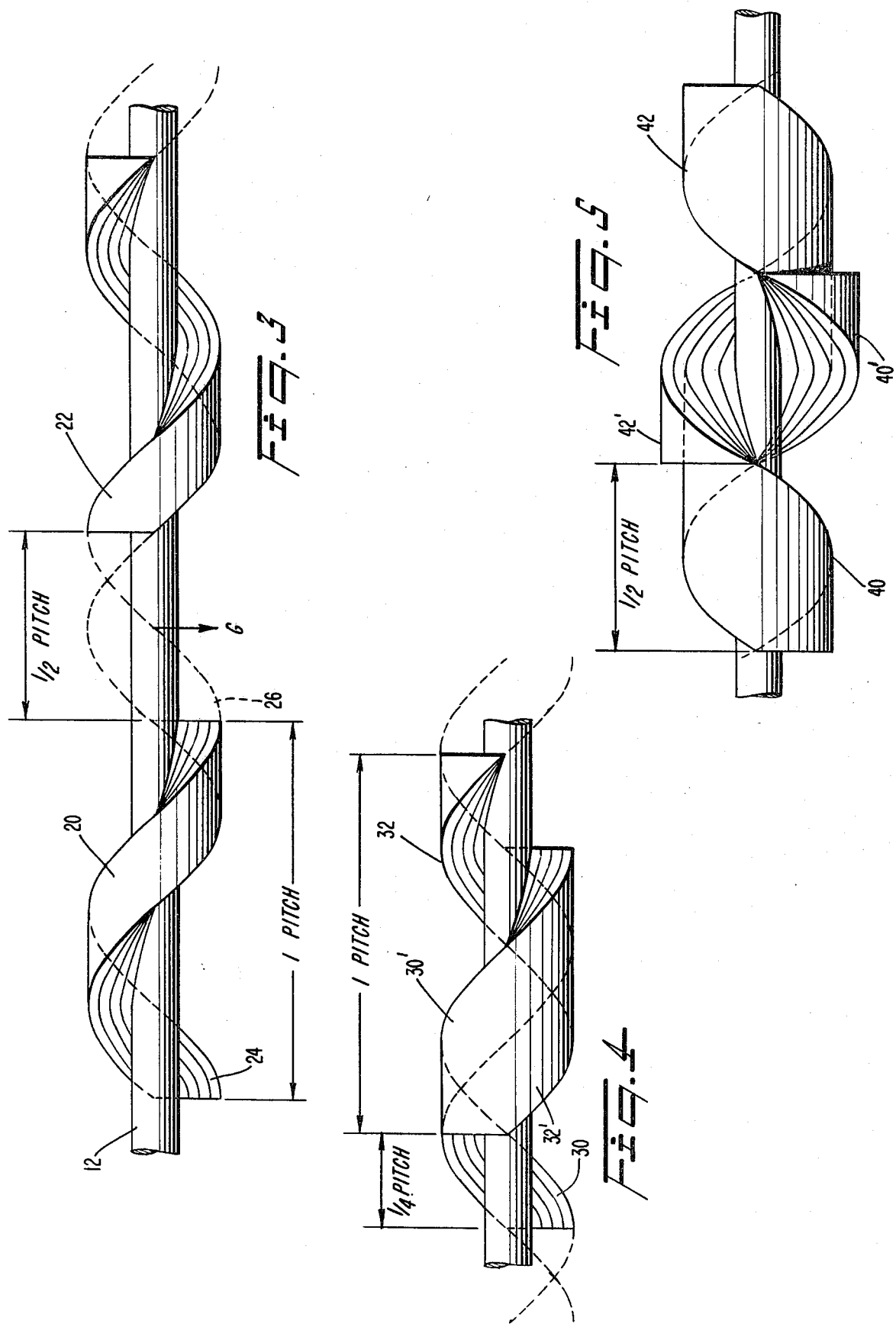

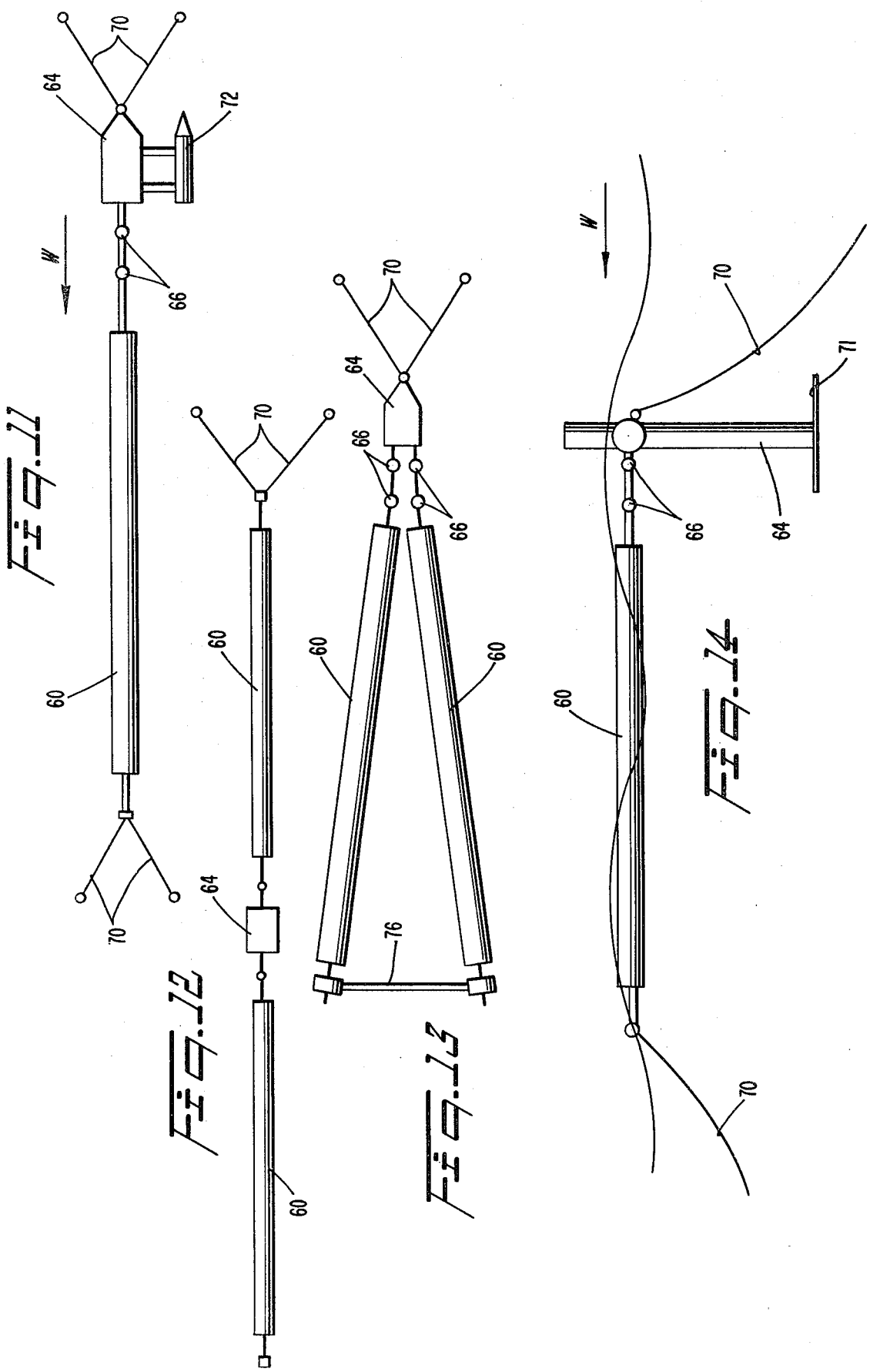

WAVE ENERGY CONVERTER

BACKGROUND OF THE INVENTION

The present invention relates to apparatus for converting the energy of surface waves in a liquid, such as an ocean, to more useful forms of energy. Most known systems for harnessing the energy from waves comprise floating structures which are set in motion by the movement of the liquid surface. These systems generally display alternating motions in response to the wave action. Since mechanical energy is more easily used and transferred if in the form of a continuous rotation, sophisticated mechanisms, such as hydraulic pumps and hydraulic motors, have to be used to transform the alternating motions of the various parts into a rotary motion.

One attempt for solving this technical problem has been described in U.S. Pat. Nos. 3,818,703 and 3,818,704. These patents are concerned with a device, having a response to progressive waves in the form of a rotary motion instead of alternated movements. A helically shaped buoyant mass is curved around an imaginary or real axis of rotation. As wave motion progresses along the axis of the helix, the buoyant forces acting on successive sections of the helix impart rotation to the buoyant mass. An energy conversion means, such as a generator, is linked to the rotating helical mass, and may be used to convert the rotational motion to another form of energy.

The above-named patents disclose a generally suitable approach to conversion and use of the energy found in waves within a body of water. However, the apparatus disclosed in these patents suffers from certain serious drawbacks.

Hydrostatics calculations and experiments show that a homogenous simple helix freely floating in still water will not float with its axis horizontal. Its positions of hydrostatic equilibrium are found with the axis tilted with respect to the surface of the water. As the helix is rotated in the water, the angle between the axis and the surface changes. If the simple helix is allowed to float freely and assume one of its positions of stable equilibrium having its axis tilted with respect to the surface of the water, it will be necessary to apply a substantial torque to the helix to move it rotationally from its equilibrium position. Smaller waves will not be effective to provide sufficient torque to set the helix into rotary motion. In waves high enough to overcome the torques resisting motion of the helix, a very irregular rotary motion will occur, along with an alternating tilting motion of the axis.

The only way to alleviate these problems associated with the prior art apparatus would be to maintain the axis of the helix in a horizontal position at the water level. This could be accomplished by fixing the axis in bearings anchored to the marine bed by means of rigid structures or taut mooring cables. This would restore neutral rotational balance. However, as the helix rotates, the center of buoyancy of the helix continually shifts back and forth along the axis thereof while the center of gravity of the helix remains in a fixed axial location. The result would be a cyclically varying stress applied to the bearings supporting the helical mass for rotation. This stress would cause undue wear on the bearings, and increase the expense of constructing and maintaining the apparatus. Also, the need for mooring structures would greatly increase the cost of the apparatus.

SUMMARY OF THE INVENTION

The present invention overcomes the problems and disadvantages associated with the above-described prior art apparatus. The present invention comprises apparatus for converting the energy of surface waves in a liquid, and includes a buoyant mass mounted for rotation about an axis and responsive to surface waves to rotate about the axis. The configuration of the mass is such that the center of buoyancy of the rotational mass remains in a fixed axial location for all angles of rotation of the mass. Additionally, the buoyant mass is in rotational equilibrium at all angles of rotation about its axis when freely floating on the water surface. Thus, there are no self-generated rotational forces which would tend to resist the rotation imparted by surface waves and even very small waves would be sufficient to impart rotation to the device. Also, the axis of the mass always remains parallel to the surface when freely floating in still water. Consequently, the need to fix the axis of the rotational mass by means of bearings anchored to the marine bed is obviated. Additional objects and advantages of the invention will be set forth in the description which follows.

In order to achieve the above-stated objects and advantages, the present invention provides an improved apparatus for converting the energy of surface waves in a body of liquid. The apparatus comprises a buoyant mass rotatable about an axis in response to surface waves in the liquid. The center of buoyancy of the rotational buoyant mass remains in a fixed axial and radial location for all angles of rotation of the mass. As a result, the axis of the mass remains in a stable position when freely floating in still water at any angle of rotation about the axis. Additionally, the buoyant mass has a configuration such that it remains in rotational equilibrium at all angular orientations about the axis.

As embodied herein, the rotational buoyant mass associated with the apparatus of the present invention comprises at least a pair of helically configured volumes jointly rotatable about a common axis. The helical volumes are rotationally displaced about the axis with respect to one another. The respective volumes constituting each pair may be axially spaced from one another along the common axis, or may be positioned adjacent one another, forming a unitary buoyant body. As embodied herein, the length of each volume is preferably an integer multiple of its pitch.

The invention consists in the novel construction and arrangements as shown and described herein. The accompanying drawings, which are incorporated in and constitute a part of the specification, illustrate preferred embodiments of the invention and, together with the description, serve to explain the principles of the invention.

BRIEF DESCRIPTION OF THE DRAWINGS

FIGS. 2A–2H illustrate the forces acting upon a prior art device similar to that of FIG. 1 at a sequence of angular positions during rotation of the buoyant mass having its axis fixed to remain horizontal in still water.

FIG. 3 illustrates a first embodiment of the buoyant mass of the present invention, comprising two helical volumes, axially separated from one another.

FIGS. 4 and 5 illustrate additional embodiments of the buoyant mass of the present invention, comprising helical volumes which are contiguous with one another, forming essentially a unitary buoyant mass.

FIGS. 10–14 illustrate several arrangements of the rotary mass of the present invention in conjunction with means to convert rotation of the mass into another form of energy.

DESCRIPTION OF THE PREFERRED EMBODIMENTS

Figure 1:
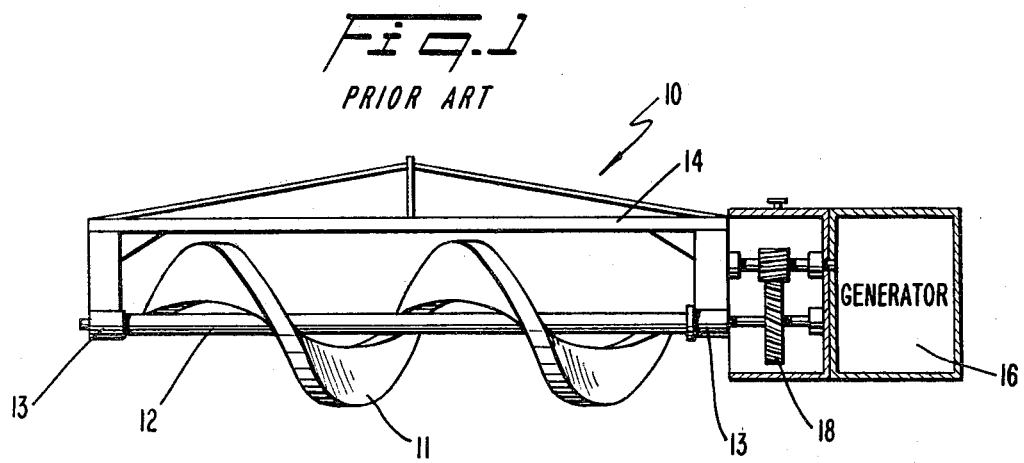
FIG. 1 is an illustration of a wave energy conversion apparatus of the prior art.
Figure 2A:
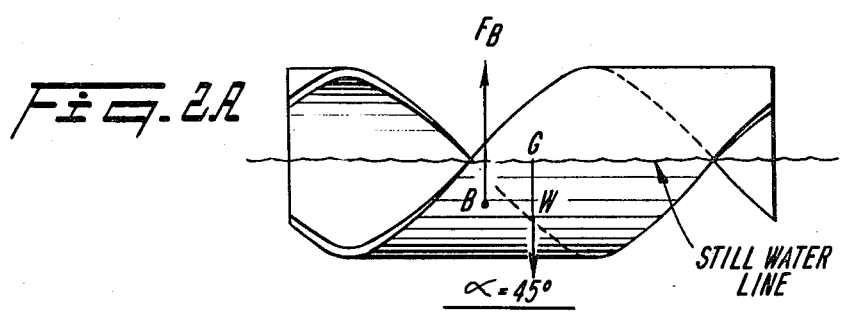
Figure 2B:
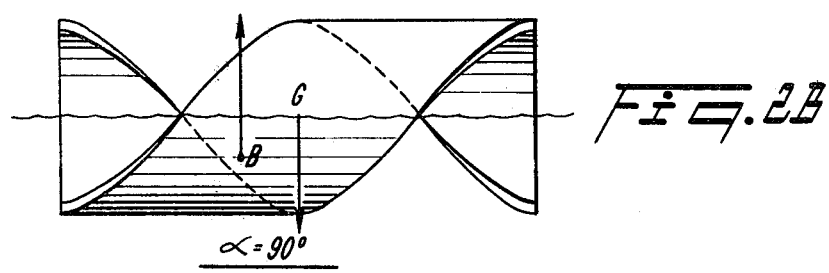
Figure 2C:
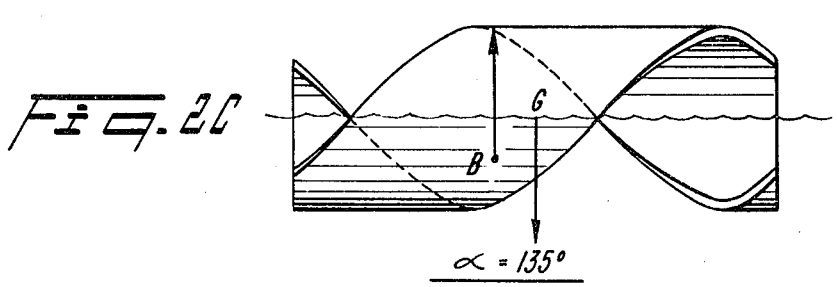

In order to fully understand and appreciate the present invention, it will be of great assistance to first analyze the operation of the energy conversion apparatus of the prior art. FIG. 1 illustrates the wave energy converter disclosed in U.S. Pat. No. 3,818,703. That apparatus, generally designated by reference numeral 10, comprises a buoyant helical mass 11 rotationally supported along axis 12 by means of bearings 13. Framework 14 of the apparatus, in addition to supporting the axis and helical mass, also supports an energy conversion means, such as generator 16, as well as reduction gears 18. Framework 14 also serves to increase the rigidity of the apparatus. The apparatus is positioned in a body of water so that surface waves within the body will pass generally along the axis 12 of the device. The relative linear motion of the surface waves imparts buoyant forces to successive portions of the helical mass 11, imparting rotation to the mass, thereby turning the axle or axis 12 in its bearings. The mass and axis are suitably linked to a power conversion means such as that shown in FIG. 1.

FIGS. 2A–2H illustrate the forces acting upon a buoyant helical mass when fixed in a horizontal position in still water at successive stages in its revolution, at varying angles of rotation, $\alpha$, except for the reaction forces of the bearings. It will be noted that the center of gravity of the helix, designated by G, remains axially fixed throughout the rotary cycle. However, depending upon which portion of the helix is immersed in water, the center of buoyancy B will shift axially. As the helical mass rotates about its axis, the center of buoyancy will oscillate between positions lying axially on each side of the center of gravity. During one complete cycle, the center of buoyancy will twice pass along the axis through the plane containing the center of gravity. Consequently, the position of the buoyant force $F_B$ continually shifts with respect to the position at which the gravitational force W is applied to the helical volume. The result is a fluctuating couple varying cyclically with the rotation of the helical mass 11. The fixed bearings supporting the helix will therefore be subject to cyclical stresses and require frequent replacement in order to maintain the apparatus in proper operating condition.

If the helical mass 11 is allowed to float freely, it will assume a position of stable equilibrium with its axis tilted and the center of buoyancy located on the same vertical line as the center of gravity. The center of buoyancy is located on this vertical line at only four rotational positions, 90°, 180°, 270° and 360°. Only at these four rotational positions will the mass be in rotational equilibrium. At all other rotational positions, the eccentrically located buoyant force will generate a non-zero torque about the axis. Furthermore, the horizontal position of the axis is stable only at 180° and 360°, with the result that only two rotational positions of the mass are positions of stable equilibrium. As a result of the existence of the four preferential angular positions, in order to set the helix in rotation from one preferential position to another, one must create a non-zero torque during a quarter revolution until the first unstable equilibrium position is reached. The helix will then rotate by itself until it finds the other stable equilibrium position.

In order to overcome the self-generated torque in the freely floating helix and impart rotary motion, substantial rotational forces must be applied thereto. Low amplitude waves are unable to create torques large enough to rotate the helix from one angle of equilibrium to another. Thus, the motion of the helix is a rather useless oscillation in low amplitude waves. For waves of greater amplitude, the helix is set into very irregular rotation due to the existence of the cyclical self-generated resisting torques. Also, a large pitching motion of the axis occurs, which decreases the wave action on the helix.

Reference will now be made in detail to the preferred embodiments of the present invention, examples of which are illustrated in the accompanying drawings. The present invention is concerned with an improved variety of wave energy conversion apparatus which comprises a rotational buoyant mass, the operation of which is not limited by the above-described drawbacks.

FIG. 3 illustrates a first embodiment of a rotor constructed in accordance with the principles of the present invention. Rotary shaft 12 coincides with the rotational axis of the buoyant mass of the present invention, and is generally analogous to the shaft of axis 12 illustrated in FIG. 1. The buoyant mass comprises a pair of helical volumes 20 and 22 curved around the axis 12. Each helix has a horizontal dimension equal to its pitch. Contour lines 24, included for the sake of clarity, also serve to illustrate the fact that the helical volumes may comprise layers of buoyant material. Alternatively, the helical volumes 20 and 22 may comprise hollow formations formed from metal, plastic, or any other suitable material.

In a helical volume, two cross-sections are identical but rotated with respect to one another by an angle proportional to the axial distance separating them. The distance between two sections rotated 360° is called the pitch. The distance between the two end sections of a helix will be called the length of the helix. The adjacent, or opposed, ends of helices 20 and 22 are axially spaced from one another a distance equal to one-half the pitch of the respective helices. Phantom lines 26 serve to illustrate the fact that helix 20 could be continued an additional length equal to one half its pitch in order to meet the adjacent end of helix 22. In addition to being axially spaced by a distance equal to one-half the pitch, the helices are angularly displaced with respect to one another by one-half a revolution, or 180°, about axis 12. As embodied herein, each helix has a length equal to its pitch.

As can be observed with respect to FIGS. 2A–2H, for two positions of a single helix, half a revolution apart, the projections of the center of buoyancy on the axis will be found at two symmetrically opposite positions with respect to the center of gravity. In the device of FIG. 3, having center of gravity G, and helix 22 rotated one-half revolution with respect to helix 20, the centers of buoyancy of the respective helices will be at equal distances on opposite sides of the center of gravity for every angle of rotation. Thus, the composite center of buoyancy will always be on the same vertical line as the center of gravity G. Therefore, when freely floating in still water, the rotational mass shown in FIG. 3 will always maintain a horizontal axis. As a result, the rotational buoyant mass of FIG. 3 will also be in rotational equilibrium at any angular position. In other words, it can be rotated without producing any resisting torques.

Since the center of buoyancy and center of gravity are on the same vertical line, couples which would tend to tilt the axis of the device are eliminated. Thus, the need to fix the position of the shaft by means of bearings is obviated. Consequently, the helical volumes 20 and 22 and shaft 12 may be freely floated on the surface of a body of water. Also, since the self-induced torques resisting rotary motion are eliminated, the buoyant rotor of the present invention may be set into rotary motion by waves of relatively low amplitude.

The embodiment of FIG. 3, having distinct and axially spaced helical volumes, may be unduly long and cumbersome for some applications. Devices of this type can easily reach lengths of 400 to 600 feet or more. The embodiments of FIGS. 4 and 5 overcome this drawback without sacrificing other advantages of the present invention.

FIG. 4 illustrates an embodiment of the present invention comprising helical volumes 30 and 32 positioned about a common axis of rotation. Portions 30' and 32' of the respective helices are contiguous with one another, thereby forming a portion of the buoyant mass having a cross-section substantially larger than the cross-section of either of the helices alone. The two helices, each having a length equal to the pitch, are rotationally displaced with respect to one another by one-half revolution, or 180°. Thus, as for the embodiment of FIG. 3, the respective centers of buoyancy for each helix will be found at symmetrically opposite positions with respect to the center of gravity of the device and the composite center of buoyancy will be on the same vertical line as the center of gravity.

The corresponding adjacent ends of the helices are axially spaced from one another by a distance equal to one-quarter the pitch. A spacing of one-half the pitch might be more desirable for horizontal stability of the system in high waves. However, tests of the FIG. 4 embodiment have demonstrated a very smooth rotation and a satisfactory absence of pitching motion of the axis. Additionally, as compared to the FIG. 5 embodiment, to be described below, having a one-half pitch spacing, the quarter-pitch spacing facilitates reduction of the overall length of the apparatus while still yielding highly satisfactory results.

The embodiment of FIG. 5 is somewhat similar to that of FIG. 4, in that the respective helices 40 and 42 form a unitary buoyant mass. Helices 40 and 42 are rotated with respect to one another by one-half revolution. In this embodiment, however, the corresponding ends of the respective helices are spaced an axial distance of one-half pitch from one another. The contiguous portions 40' and 42' of the helices, rather than being positioned axially adjacent one another, overlap each other in the radial direction. The result is a unitary buoyant mass having a center portion of relatively enlarged diameter.

The embodiments thus far described have dealt mainly with an application of the principles of the present invention to the design of rotors combining a single pair of helical volumes. It is also possible to combine a larger number of pairs so as to obtain more suitable or desirable designs. If each pair of helices is in equilibrium at every angle of rotation, structures obtained from combinations of pairs will also have this property.

Figure 6:
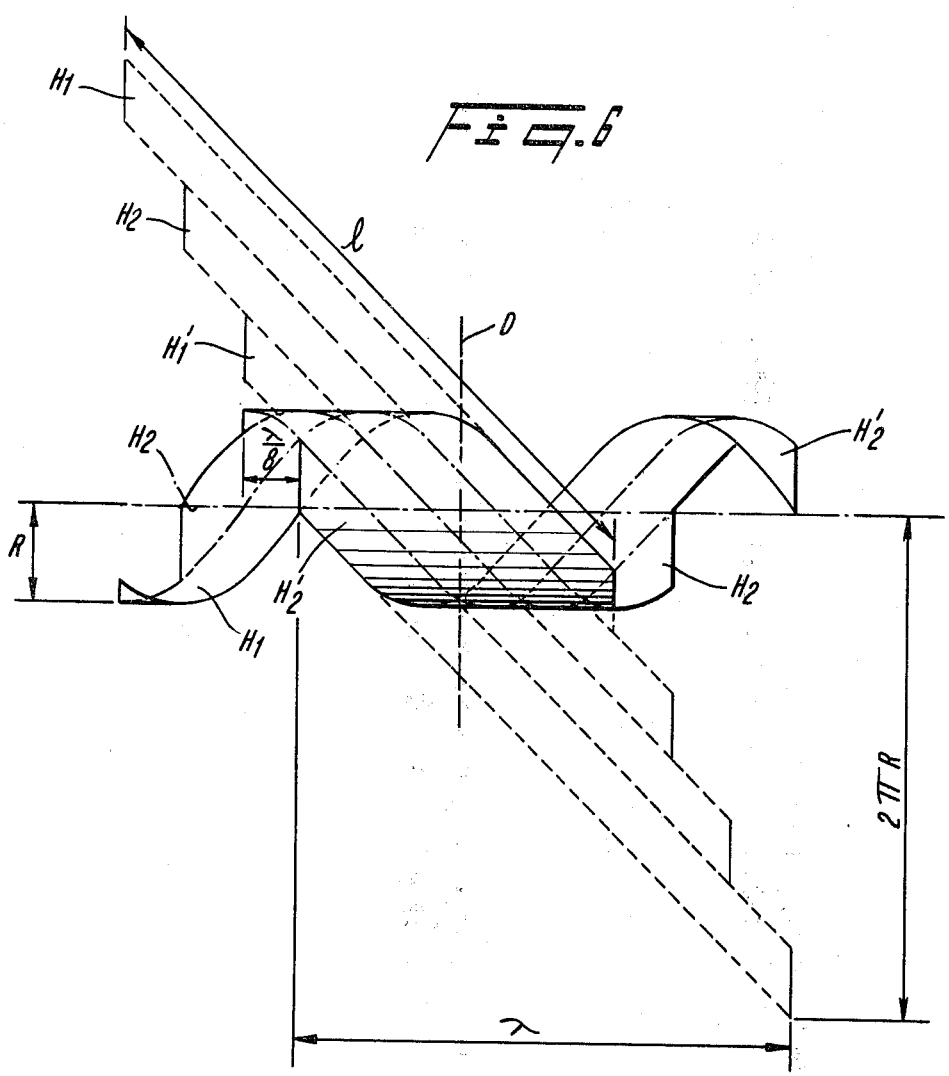
FIGS. 6 and 7 illustrate another embodiment of the present invention wherein the buoyant mass comprises multiple pairs of helical volumes forming a unitary buoyant mass.

FIG. 6 shows a combination of two pairs of helical strips, the first pair corresponding to the helices $H_1$ and $H'_1$, the second pair $H_2$ and $H'_2$. The dashed lines show these strips once unrolled in the plane of the figure. As the inventive apparatus is embodied herein, each helix must have a length equal to its pitch or a multiple of its pitch. This is necessary if the center of buoyancy in still water is to stay in a vertical plane containing the common axis of the helices. As each strip is rolled one full turn around an imaginary cylinder of radius R, as shown in FIG. 6, along a length of this cylinder, the length of an unrolled strip is $l = \sqrt{\lambda^2 + (2\pi R)^2}$.

For maximum torque in waves, the width of each strip has to be chosen so that the four strips will cover one-half circumference of the cylinder at the midsection of the surface thereof. This midsection is shown on FIG. 7D. This means that the vertical width of the unrolled combination of helices must be $\pi R$ at its maximum vertical width, along line D of FIG. 6. Hence each strip must be $\pi R/4$ wide.

As previously discussed, for one pair of helices to exhibit equilibrium in still water, one helical strip must be rotated half a revolution with respect to the other of the pair. Consequently, the vertical distance between the ends of two strips of the same pair, once unrolled in the plane of the figure, must be one half the circumference of the imaginary cylinder they were rolled around, i.e., $\pi R$. FIG. 6 shows this vertical distance $\pi R$ between $H_1$ and $H'_1$, and also between $H_2$ and $H'_2$.

Finally, the horizontal distance between $H_1$ and $H'_1$, and between $H_2$ and $H'_2$, has to be chosen so that, in addition to the previous design constraints, the resultant combination of the four helices will still be a continuous surface without gaps between each helix. The required horizontal distance between the helices of a pair is in this case $\lambda/4$. Therefore, in FIG. 6, the two helices of one pair are displaced one from the other by a rotation of a half revolution plus a translation $\lambda/4$.

What has been described thus far is a combination of flat strips rolled around an imaginary cylinder. The following process describes how to generate volumes from these flat strips. One can consider that the strips have a certain radial thickness, so that rolling several strips one above the other will finally yield a desired radial thickness of the resulting volume. Therefore, one can start with a shaft or a thin imaginary cylinder, and roll up a combination of two pairs of strips as just described. Then around the imaginary cylinder containing the outer face of this layer, one can roll another combination of strips, similar to the previous one, but dimensioned to accommodate the new radius, and so on, until the desired final radius is obtained. Alternatively, the entire volume of the helices can be formed as a hollow body of steel, plastic, etc., or as a molded body of buoyant material.

Figure 7:
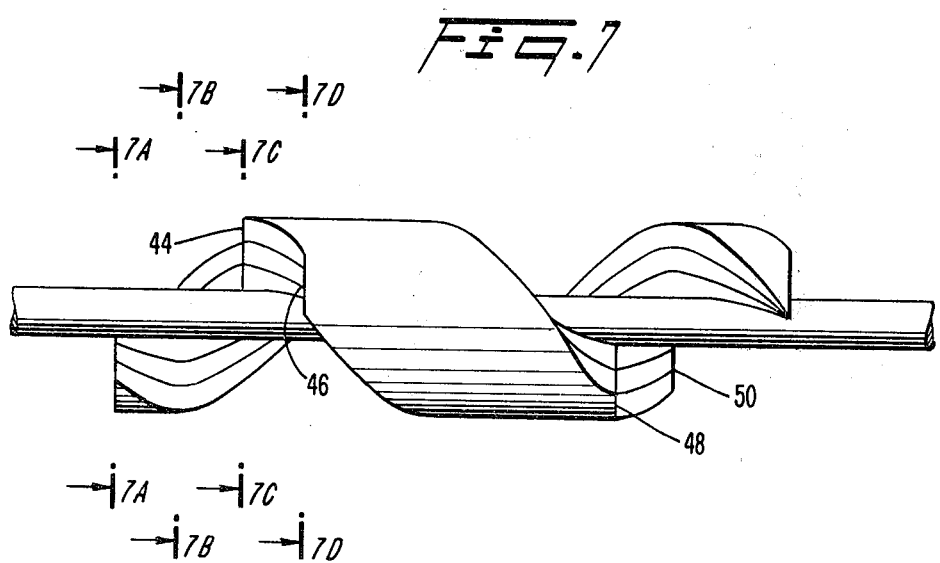
Figure 7A:
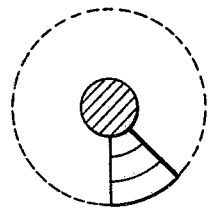
FIGS. 7A–7D are cross-sectional views of various portions of the device of FIG. 7.
Figure 7C:
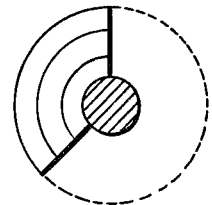
Figure 7B:
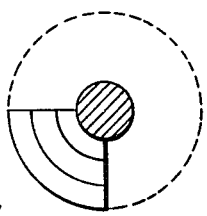
Figure 7D:
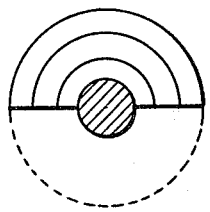

FIG. 7 illustrates the overall configuration of the buoyant mass formed in accordance with the illustration of FIG. 6. FIGS. 7A-7D illustrate the cross-sections of the buoyant mass of FIG. 7, taken along lines A-D thereof, respectively.

Figure 8:
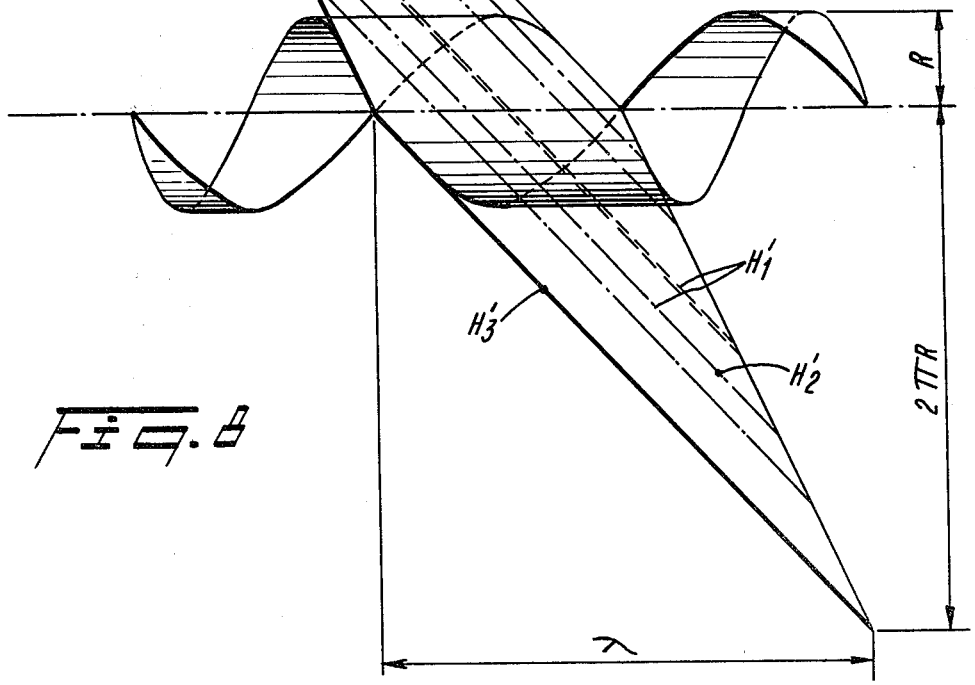
FIGS. 8 and 9 illustrate a modification of the embodiment of FIGS. 6–7 comprising numerous pairs of helical volumes formed into a streamlined configuration.
Figure 9:
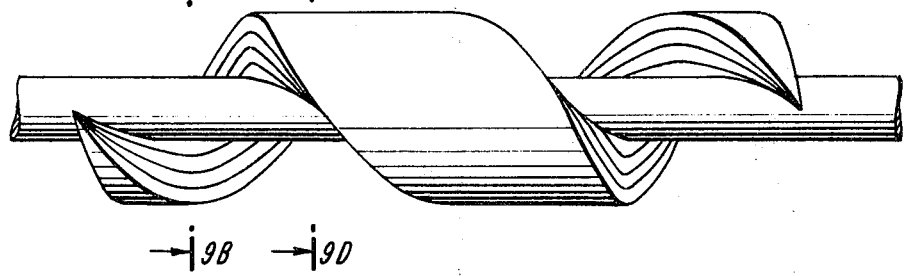
Figure 9A:
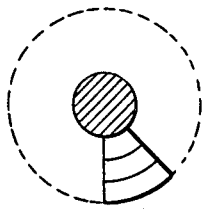
FIGS. 9A–9D are cross-sectional views of various portions of the device of FIG. 9.
Figure 9B:
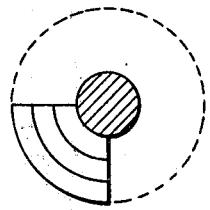
Figure 9C:
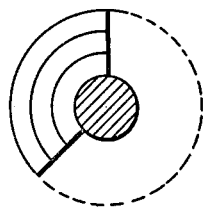
Figure 9D:
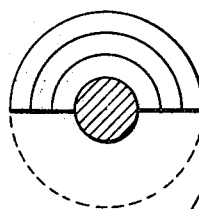

FIGS. 8 and 9 illustrate still another embodiment of the present invention. The FIGS. 6-7 embodiment comprises various flats, or shoulder portions, 44, 46, 48 and 50. These shoulders exhibit resistance, or drag, to wave motion along the axis of the rotational mass, diffusing some of the incoming wave energy and reducing the overall efficiency of the apparatus. In order to eliminate these shoulders or flats, the helices $H_1$, $H_2$, etc., are reduced substantially in width and many pairs of the relatively narrow helices are provided. This is illustrated in FIG. 8. The juxtaposition of numerous narrow helices forms a buoyant body having smooth contours and a streamlined configuration, as shown in FIG. 9. The elimination of the shoulders 44-50 significantly reduces energy losses resulting from interaction of the shoulders with the surface waves.

In FIG. 8, each very narrow helix is represented by a line $H_1$, $H_2$, etc. As discussed with respect to FIGS. 6-7, two helical lines from one pair, such as $H_1$ and $H'_1$, or $H_2$ or $H'_2$, must be displaced from each other by a rotation of half a revolution, and an axial translation. Torque calculations have shown that in waves, the maximum torque is obtained if the midsection of the composite volume is a half circle. This means that the vertical width of the developed surface should be $\pi R$. Despite all these dimension requirements, it is possible to generate a continuous surface, provided that the horizontal distance between two helices of each pair be chosen equal to $\lambda/4$ ($\lambda$=pitch of the helices).

A volume can be generated by layering helical surfaces, as previously described, or by forming a single hollow volume of metal or other suitable material. A solid molded body of buoyant material may also be used.

FIGS. 9A-9D show the cross-section of the volume of FIG. 9, taken at lines A-D, respectively.

Experiments and calculations indicate that the most favorable power extraction characteristics can be obtained if the pitch of each elementary helix making up the whole structure is made close to the wavelengths of the incoming waves, and the outer radius R is of the order of magnitude of the wave amplitude. Knowledge of the wave field conditions at the site of settlement of the rotor is necessary to the optimization of $\lambda$ and R. These two parameters completely define the design of the embodiments of FIGS. 6-9.

The descriptions above have been given as illustrating examples, and therefore should not be interpreted as limiting the shape of the invention.

Figure 10:
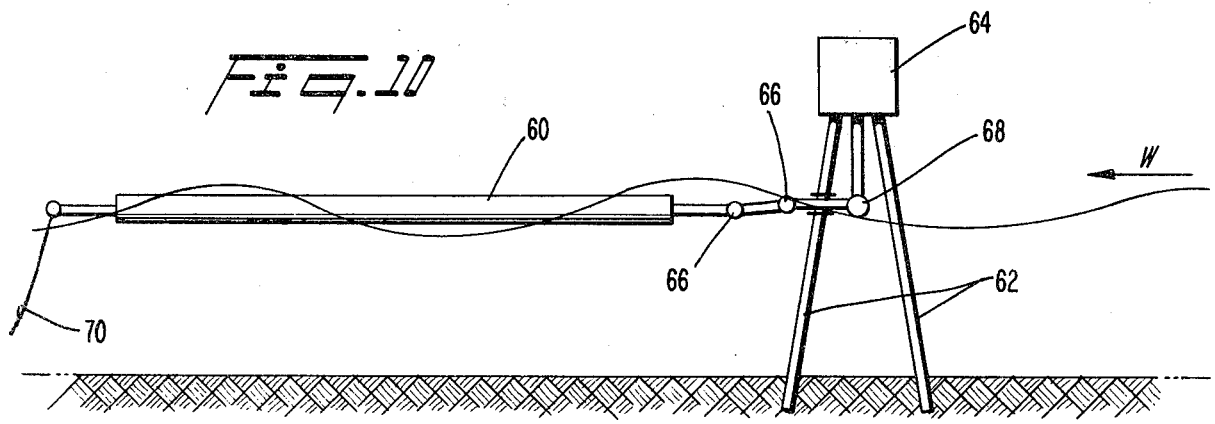

FIGS. 10-14 illustrate various arrangements of the rotational buoyant mass of the present invention with means for converting the rotation thereof into another form of usable energy. FIGS. 11-13 are plan views, while FIGS. 10 and 14 are elevational views. In the embodiment of FIG. 10, the freely floating rotational buoyant mass of the present invention, designated by reference numeral 60, is operatively coupled through universal joints 66 and reduction gear 68 to conversion means 64. This means may comprise an electrical generator, or some similar device. The entire apparatus is anchored to the bed of the body of water by means of supports 62.

In the arrangement shown in FIG. 11, the rigid supports 62 are eliminated. The energy conversion means 64 is buoyantly supported on the surface of the body of water, and is anchored by means of moorings 70. Rotational mass 60 is coupled to the energy conversion means through universal joints 66. A flotation device, such as pontoon 72, rotationally stabilizes energy conversion means 64 in order to prevent the conversion means from rotating along with the rotary mass 60.

FIGS. 12 and 13 illustrate embodiments of the present invention comprising dual rotational buoyant masses, each comprising a distinct axis of rotation. In FIG. 12, rotational buoyant masses 60 and 60' are coupled to opposite sides of energy conversion means 64. The entire apparatus is moored by means of cables 70. The rotational buoyant masses 60 and 60' are adapted to rotate in opposite directions in response to wave action in a given axial direction. The opposing torques applied to conversion means 64 cancel one another, thereby maintaining conversion means 64 in a relatively stable rotational position. The apparatus of FIG. 13 comprises dual rotational buoyant masses 60 and 60', also rotating in opposite directions, and laterally spaced from one another by means of strut 76. Each of the rotational masses is coupled to conversion means 64 through appropriate universal joints 66. The opposite torques applied to energy conversion means 64 maintain the latter in a stable angular position.

In the arrangement illustrated in FIG. 14, the energy conversion means 64 is located within a deep vertical buoy, which may comprise a damping disk 71. This buoy would exhibit almost no heaving motion in waves, thus limiting the degree of motion of universal joints 66. The low center of gravity of the buoy will prevent it from rotating.

It is evident from the above descriptions, that the arrangements of FIGS. 11-14 are more readily and economically sited in a body of water, or relocated from one site to another, than the rigidly mounted energy conversion apparatus depicted in FIG. 10. More importantly, due to the unique stability of the apparatus of the present invention, the rotational masses 60 associated with each embodiment can be freely floated on the surface of the body of water, eliminating the need for bearings and associated means for securing the apparatus in a horizontal position by means of rigid structures or taut cables affixed to the sea floor.

It will be apparent to those skilled in the art that numerous modifications and variations can be made in the apparatus of the present invention. Thus, it is intended that the present invention cover any such modifications and variations provided they come within the scope of the appended claims and their equivalents.

What is claimed is:

1. Apparatus for converting the energy of surface waves in a liquid comprising a buoyant mass rotatable around an axis of rotation, said buoyant mass comprising at least two similar helical volumes having a common axis coincident with said axis of rotation, said helical volumes being fixed for joint rotation about said axis, the position of one of said helical volumes being rotationally displaced about said axis with respect to the position of the other said helical volume.

2. Apparatus as in claim 1, wherein a first of said helical volumes is rotationally displaced one-half revolution with respect to a second of said helical volumes.

3. Apparatus as in claim 2, wherein said volumes have an identical pitch and are displaced with respect to one another along said axis of rotation a distance equal to one-half the pitch.

4. Apparatus as in claim 2, wherein said volumes have an identical pitch and are displaced with respect to one another along said axis of rotation a distance equal to one-quarter the pitch.

5. Apparatus as in any one of claims 3 or 4, wherein the displacement along said axis is measured between corresponding ends of said helical volumes.

6. Apparatus as in any one of claims 3 or 4, wherein the displacement along said axis is measured between opposing ends of said helical volumes.

7. Apparatus as in any one of claims 1, 2 or 3, wherein said helical volumes are spaced from one another along said axis of rotation.

8. Apparatus as in any one of claims 1, 3 or 4, wherein said helical volumes are contiguous with one another, forming a unitary buoyant body on said axis.

9. Apparatus as in claim 8, wherein said at least two helical volumes include respective helical portions which are contiguous with one another along said axis of rotation, forming a unitary buoyant body.

10. Apparatus as in claim 9, wherein said helical portions comprise less than the entire respective lengths of said at least two helical volumes.

11. Apparatus as in claim 8, wherein said at least two helical volumes include respective helical portions which occupy substantially the same position along said axis, and are superimposed radially upon one another, forming a unitary buoyant body.

12. Apparatus as in claim 1, comprising multiple pairs of helical volumes, the volumes of each pair being displaced about said axis with respect to one another.

13. Apparatus as in claim 12, wherein all of said helical volumes are contiguous with one another forming a unitary buoyant body.

14. Apparatus as in any one of claims 12 or 13, comprising numerous pairs of relatively narrow helical volumes contiguous with one another along said axis, forming a unitary buoyant body having essentially a helical configuration with streamlined tapered end portions.

15. Apparatus as in claim 12, wherein the helical volumes of each said pair are axially displaced with respect to one another a distance equal to one-half the pitch of said helical volumes.

16. Apparatus as in claim 14 wherein the volumes of each pair are rotationally displaced one-half revolution with respect to one another.

17. Apparatus as in claim 15 wherein the volumes of each pair are rotationally displaced one-half revolution with respect to one another.

18. Apparatus as in claim 14, wherein the helical volumes of each said pair are axially displaced with respect to one another a distance less than one-half the pitch of said helical volumes.

19. Apparatus as in claim 1 wherein, the average density of said apparatus is substantially one-half the density of water, whereby, in still water, said apparatus will float with said axis substantially at the surface of the water.

20. Apparatus for converting the energy of surface waves in a liquid, comprising:

at least one axis of rotation;
a buoyant mass on said at least one axis, said mass comprising at least two substantially like helical volumes curved about said axis; and
the position of one of said helical volumes being displaced about said axis with respect to the other of said helical volumes.

21. Apparatus as in claim 20, comprising two axes of rotation, and at least two of said helical volumes on each said axis.

22. Apparatus as in claim 21, wherein said at least two axes are colinear, and the helical volumes associated with each said axis of rotation are adapted to rotate in opposite directions in response to surface waves.

23. Apparatus as in claim 21, wherein said at least two axes are displaced laterally from one another, and the helical volumes associated with each said axis of rotation are adapted to rotate in opposite directions in response to surface waves.

24. Apparatus as in any one of claims 20, 22 or 23, further comprising energy conversion means for adapting rotation of said buoyant mass to a useable form of energy, and means for maintaining said apparatus at a fixed location in said liquid, whereby a non-zero relative velocity will exist between the apparatus and waves in the liquid.

25. Apparatus for converting the energy of surface waves in a liquid, comprising:

a buoyant mass mounted for rotation about an axis, said buoyant mass being responsive to surface waves to rotate about said axis, and said mass having a center of buoyancy which remains in a fixed axial location for all angles of rotation of said mass, wherein said buoyant mass comprises at least one pair of helical volumes, a first helical volume of said pair being displaced about said axis by one-half revolution with respect to the other helical volume of said pair.

26. Apparatus as in claim 25, wherein said helical volumes constituting said pair are distinct from one another and are axially separated along said axis.

27. Apparatus as in claim 25, wherein said helical volumes of said pair are positioned contiguous with one another forming a unitary buoyant mass.

28. Apparatus for converting the energy of surface waves in a liquid, comprising:

a buoyant mass mounted for rotation about an axis, said buoyant mass being responsive to surface waves to rotate about said axis, said mass being in rotational equilibrium when freely floating at all angles of rotation thereof about said axis in still water, said buoyant mass comprising at least one pair of helical volumes, a first helical volume of said pair being displaced about said axis by one-half revolution with respect to the other helical volume of said pair.

29. Apparatus as in claim 28, wherein said helical volumes constituting said pair are distinct from one another and are axially separated along said axis.

30. Apparatus as in claim 28, wherein said helical volumes of said pair are positioned contiguous with one another forming a unitary buoyant mass.

* * * * *